United States Patent
Paulson

(10) Patent No.: US 8,886,211 B2
(45) Date of Patent: Nov. 11, 2014

(54) NOTIFICATION ADJUSTMENT FOR COMPUTING DEVICES

(75) Inventor: Janell Paulson, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1477 days.

(21) Appl. No.: 12/127,612

(22) Filed: May 27, 2008

(65) Prior Publication Data

US 2009/0298511 A1    Dec. 3, 2009

(51) Int. Cl.
  *G06F 15/16* (2006.01)
  *H04M 19/04* (2006.01)
  *H04M 1/725* (2006.01)

(52) U.S. Cl.
  CPC ...... *H04M 1/72572* (2013.01); *H04M 1/72566* (2013.01); *H04M 2250/10* (2013.01); *H04M 19/04* (2013.01)
  USPC .................................... 455/456.1; 455/414.1

(58) Field of Classification Search
  USPC ............. 455/414.1, 414.2, 432.2, 432.3, 433, 455/456.1, 550.1
  See application file for complete search history.

(56) References Cited

U.S. PATENT DOCUMENTS

| | | | |
|---|---|---|---|
| 5,884,168 A | 3/1999 | Kolev et al. | |
| 5,901,358 A | 5/1999 | Petty et al. | |
| 5,929,848 A | 7/1999 | Albukerk et al. | |
| 5,974,330 A | 10/1999 | Negishi | |
| 6,182,010 B1 | 1/2001 | Berstis | |
| 6,246,376 B1 | 6/2001 | Bork et al. | |
| 6,259,405 B1 | 7/2001 | Stewart et al. | |
| 6,360,101 B1 | 3/2002 | Irvin | |
| 6,456,234 B1 | 9/2002 | Johnson | |
| 6,542,750 B2 | 4/2003 | Hendrey et al. | |
| 6,687,608 B2 | 2/2004 | Sugimoto et al. | |
| 6,701,144 B2 * | 3/2004 | Kirbas et al. | 455/417 |
| 6,920,328 B2 | 7/2005 | Wollrab | |
| 6,928,300 B1 | 8/2005 | Skinner et al. | |
| 7,006,817 B2 | 2/2006 | Awada et al. | |
| 7,084,758 B1 | 8/2006 | Cole | |
| 7,103,370 B1 | 9/2006 | Creemer | |
| 7,212,827 B1 | 5/2007 | Veschl | |

(Continued)

FOREIGN PATENT DOCUMENTS

| | | |
|---|---|---|
| DE | 102 28 608 A1 | 1/2004 |
| EP | 1 063 837 A2 | 12/2000 |

(Continued)

OTHER PUBLICATIONS

International Search Report and Written Opinion, PCT Application No. PCT/US2009/043357, Jan. 12, 2010, 9 pages.

(Continued)

*Primary Examiner* — Sam Bhattacharya
(74) *Attorney, Agent, or Firm* — Mahamedi Paradice LLP

(57) ABSTRACT

A system and a method are disclosed for adjusting a notification mechanism within a computing device. In one embodiment, the method includes receiving a global positioning system signal corresponding to latitude and longitude positional values, calculating a current location of the computing device in response to the received global positioning system signal, determining whether the calculated current location is associated with a configuration identifying adjustment, and adjusting a notification setting on the device accordingly. In another embodiment, the system includes identifying a particular time, determining whether a notification setting to the device is needed, and if so, adjusting the notification setting for the device accordingly.

18 Claims, 5 Drawing Sheets

(56) References Cited

U.S. PATENT DOCUMENTS

| | | |
|---|---|---|
| 7,260,390 B1 | 8/2007 | Skinner et al. |
| 7,274,299 B2 | 9/2007 | Osman |
| 7,336,964 B2 | 2/2008 | Casey |
| 7,424,447 B2 | 9/2008 | Fuzell-Casey et al. |
| 7,474,892 B2 | 1/2009 | Skinner et al. |
| 7,583,972 B2 | 9/2009 | Clipsham |
| 7,613,428 B2 | 11/2009 | Blight et al. |
| 2002/0036991 A1 | 3/2002 | Inoue |
| 2002/0086680 A1 | 7/2002 | Hunzinger |
| 2002/0119788 A1 | 8/2002 | Parupudi et al. |
| 2003/0052907 A1 | 3/2003 | Rekimoto |
| 2003/0054846 A1 | 3/2003 | Parry |
| 2004/0127198 A1 | 7/2004 | Roskind et al. |
| 2004/0176107 A1 | 9/2004 | Chadha |
| 2004/0193499 A1 | 9/2004 | Ortiz et al. |
| 2004/0207522 A1 | 10/2004 | McGee et al. |
| 2005/0012611 A1 | 1/2005 | Osman |
| 2005/0129254 A1 | 6/2005 | Connor et al. |
| 2005/0227711 A1 | 10/2005 | Orwant et al. |
| 2006/0061488 A1 | 3/2006 | Dunton |
| 2007/0005419 A1 | 1/2007 | Horvitz et al. |
| 2007/0149208 A1 | 6/2007 | Syrbe et al. |
| 2007/0185980 A1 | 8/2007 | Abraham et al. |
| 2007/0192277 A1 | 8/2007 | Jackson |
| 2007/0200732 A1 | 8/2007 | Bachmaier |
| 2007/0202886 A1 | 8/2007 | Dhebri et al. |
| 2007/0225004 A1 | 9/2007 | Tang et al. |
| 2007/0271367 A1 | 11/2007 | Yardeni et al. |
| 2008/0005071 A1 | 1/2008 | Flake et al. |
| 2008/0020786 A1 | 1/2008 | Smith et al. |
| 2008/0021637 A1 | 1/2008 | Staton et al. |
| 2008/0036653 A1 | 2/2008 | Huston |
| 2008/0045173 A1 | 2/2008 | Park et al. |
| 2008/0045236 A1 | 2/2008 | Nahon et al. |
| 2008/0125102 A1 | 5/2008 | Abel et al. |
| 2008/0195312 A1 | 8/2008 | Aaron et al. |
| 2008/0261564 A1 | 10/2008 | Logan |
| 2008/0282199 A1 | 11/2008 | Gherardi |
| 2009/0005080 A1 | 1/2009 | Forstall et al. |

FOREIGN PATENT DOCUMENTS

| | | |
|---|---|---|
| EP | 1217792 | 6/2002 |
| EP | 1 494 488 A1 | 1/2005 |
| EP | 1 821 505 B1 | 9/2009 |
| KR | 10-2001-0109963 | 12/2001 |
| KR | 10-2002-00896 45 A | 11/2002 |
| KR | 10-2003-00156 24 A | 2/2003 |
| KR | 20030015624 | 2/2003 |
| KR | 10-2003-0031295 A | 4/2003 |
| KR | 10-2005-0087189 | 8/2005 |
| KR | 10-2005-0095477 | 9/2005 |
| KR | 10-2006-0008100 | 1/2006 |
| WO | WO 2005/071932 A1 | 8/2005 |
| WO | WO 2007/118125 A2 | 10/2007 |
| WO | WO 2008/027836 A2 | 3/2008 |

OTHER PUBLICATIONS

U.S. Appl. No. 12/510,002, filed Jul. 27, 2009.
European Extended Search Report, European Application No. 07102342.8, Jun. 15, 2007, 12 pages.
International Search Report and Written Opinion, International Application No. PCT/US2009/045387, Feb. 17, 2010, 8 pages.
United States Office Action, U.S. Appl. No. 11/823,850, Apr. 27, 2009, 14 pages.
United States Office Action, U.S. Appl. No. 11/823,850, Nov. 23, 2009, 15 pages.
United States Office Action, U.S. Appl. No. 11/706,872, Nov. 3, 2009, 9 pages.
EPO, Extended Search Report dated Nov. 5, 2012, EP Pat App No. 09763131.1, filed May 8, 2009.

* cited by examiner

NOTIFICATION ADJUSTMENT FOR COMPUTING DEVICES

BACKGROUND

1. Field of Art

The disclosure generally relates to the field of notification adjustment for computing devices.

2. Description of the Related Art

In certain physical locations such as churches, schools, doctor offices, movie theaters, and the like it is inappropriate for a mobile device, e.g., a mobile phone, to play a ring tone or other audible alert. Most devices currently offer an option for vibrate or silent mode as an audible alert. However, the problem with these options is that they must be manually set. In many instances users forget to set these non-audible options. In some instances users are unwilling to set the non-audible options. In yet other instances users simply do not know how to set the non-audible options. In each instance, however, when the audible ring or tone sounds it causes an immediate distraction leading to issues that include lost productivity, inattention, or disturbance relative to the activity underway.

To address this issue, some physical facilities install "jamming" systems that block all wireless connectivity to devices such as phones that attempt to operate within the facility. However, this approach may be impractical for a mobile device user. For example, if a user is in a movie theater, the user may want to receive a call from a doctor or babysitter; where a jamming system is operational, the user would be unable to receive such call. Further, the jamming approach may be overbearing on the user. For example, some types of communication to the device may not have an impact the same way as telephone calls, i.e., no disruptive conversations. For example, short message service (SMS) text messages sent to the mobile device.

Hence, there is lacking, inter alia, a mechanism for automated adjustment of audible alerts based on location of the device.

SUMMARY

One embodiment of a disclosed system (and method) is configured to adjust notification settings within a computing device. The system receives a global positioning system signal corresponding to latitude and longitude positional values. The system identifies a current location of the computing device in response to the received global positioning system signal and determines whether the calculated current location is associated with a notification adjustment event. The system adjusts a notification setting on the computing device in response to the association of the current location with the notification adjustment event.

Another embodiment of the disclosed system (and method) includes identifying a particular time, with or without location information, to determine whether a notification setting adjustment is needed. If so, the system is configured to automatically adjust the notification setting for the device accordingly.

In such instances, the disclosed configurations provide an automated system for adjusting notifications within a computing device without requiring user intervention. Such systems provide benefits of, inter alia, increased productivity and efficient device management, while continuing to retain the full functional aspects of the application operating within the mobile computing device.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

The disclosed embodiments have other advantages and features which will be more readily apparent from the detailed description, the appended claims, and the accompanying drawings, in which:

DETAILED DESCRIPTION

Figure 1:
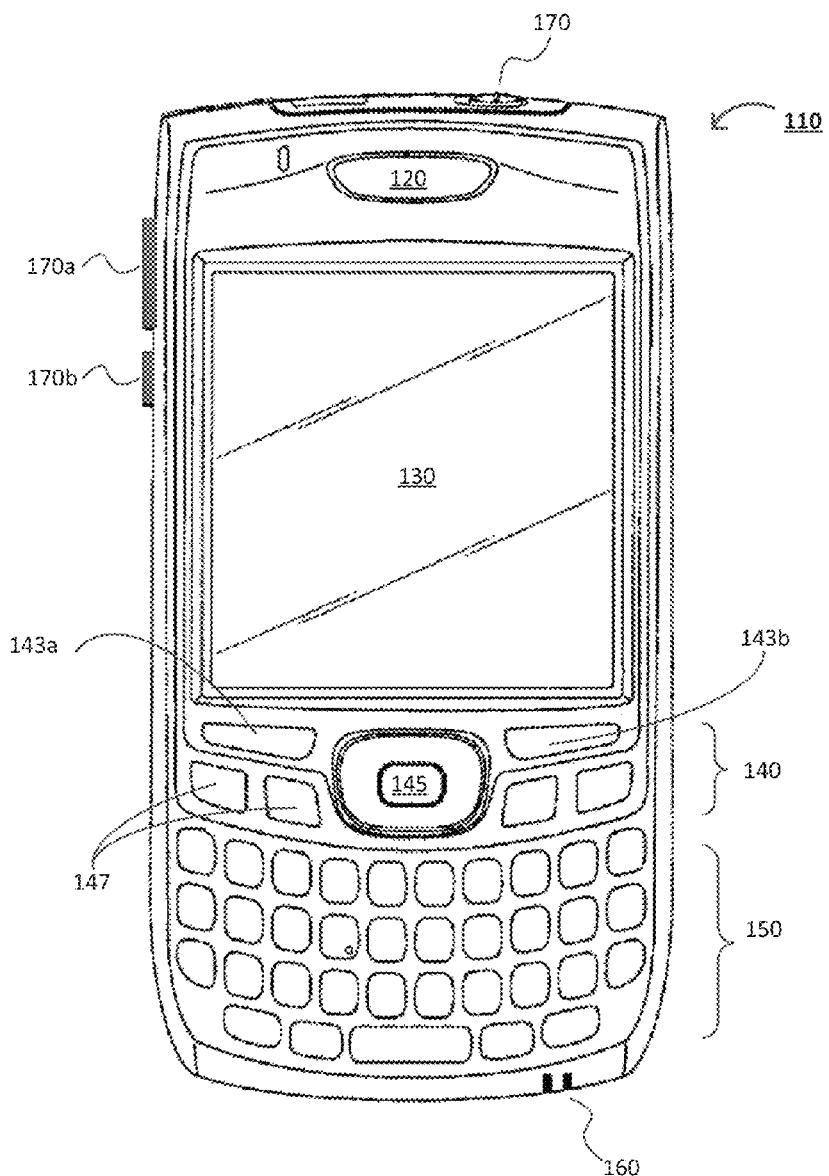
FIG. 1 illustrates one embodiment of a mobile computing device.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Mobile Computing Device

Figure (FIG.) 1 illustrates one embodiment of a mobile computing device 110 with telephonic functionality, e.g., a mobile phone or a smartphone. The mobile computing device is configured to host and execute a phone application for placing and receiving telephone calls. It is noted that for ease of understanding the principles disclosed herein are in an example context of a mobile computing device 110 with telephonic functionality operating in a mobile telecommunications network. However, the principles disclosed herein may be applied in other duplex (or multiplex) telephonic contexts such as devices with telephonic functionality configured to directly interface with public switched telephone networks (PSTN) or data networks having voice over internet protocol (VOIP) functionality.

The mobile computing device 110 is configured to be of a form factor that is convenient to hold in a user's hand, for example, a personal digital assistant (PDA) or a smart phone form factor. For example, the mobile computing device 110 can have dimensions ranging from 5 to 15 centimeters in length, 5 to 15 centimeters in width, 0.5 to 2.5 centimeters in height and weigh between 50 and 250 grams.

The mobile computing device 110 includes a speaker 120, a screen 130, a navigation area 140, a keypad area 150, and a microphone 160. The mobile computing device 110 also may include one or more switches 170, 170a, 170b (generally 170). The one or more switches 170 may be buttons, sliders, or rocker switches and can be mechanical or solid state (e.g., touch sensitive solid state switch).

The screen 130 of the mobile computing device 110 is, for example, a 240×240, a 320×320, or a 320×480 transflective display. In alternative embodiments, the aspect ratios and resolution may be different without departing from the principles of the inventive features disclosed within the description. By way of example, embodiments of the screen 130 comprises an active matrix liquid crystal display (AMLCD), a thin-film transistor liquid crystal display (TFT-LCD), an organic light emitting diode (OLED), an interferometric modulator display (IMOD), a liquid crystal display (LCD), or other suitable display device. In an embodiment, the display displays color images. In another embodiment, the screen 130 further comprises a touch-sensitive display (e.g., pressure-sensitive (resistive), electrically sensitive (capacitive), acoustically sensitive (SAW or surface acoustic wave), photo-sensitive (infra-red)) including a digitizer for receiving input data, commands or information from a user. The user may use a stylus, a finger or another suitable input device for data entry, such as selecting from a menu or entering text data.

The navigation area 140 is configured to control functions of an application executing in the mobile computing device 110 and visible through the screen 130. For example, the navigation area includes an x-way (x is a numerical integer, e.g., 5) navigation ring 145 that provides cursor control, selection, and similar functionality. In addition, the navigation area 140 may include selection buttons 143a, 143b to select functions viewed just above the buttons on the screen 130. In addition, the navigation area 140 also may include dedicated function buttons 147 for functions such as, for example, a calendar, a web browser, an e-mail client or a home screen. In this example, the navigation ring 145 may be implemented through mechanical, solid state switches, dials, or a combination thereof. The keypad area 150 may be a numeric keypad (e.g., a dialpad) or a numeric keypad integrated with an alpha or alphanumeric keypad or character keypad 150 (e.g., a keyboard with consecutive keys of Q-W-E-R-T-Y, A-Z-E-R-T-Y, or other equivalent set of keys on a keyboard such as a DVORAK keyboard or a double-byte character keyboard).

Although not illustrated, it is noted that the mobile computing device 110 also may include an expansion slot. The expansion slot is configured to receive and support expansion cards (or media cards), which may include memory cards such as CompactFlash™ cards, SD cards, XD cards, Memory Sticks™, MultiMediaCard™, SDIO, and the like.

Example Mobile Computing Device Architectural Overview

Figure 2:
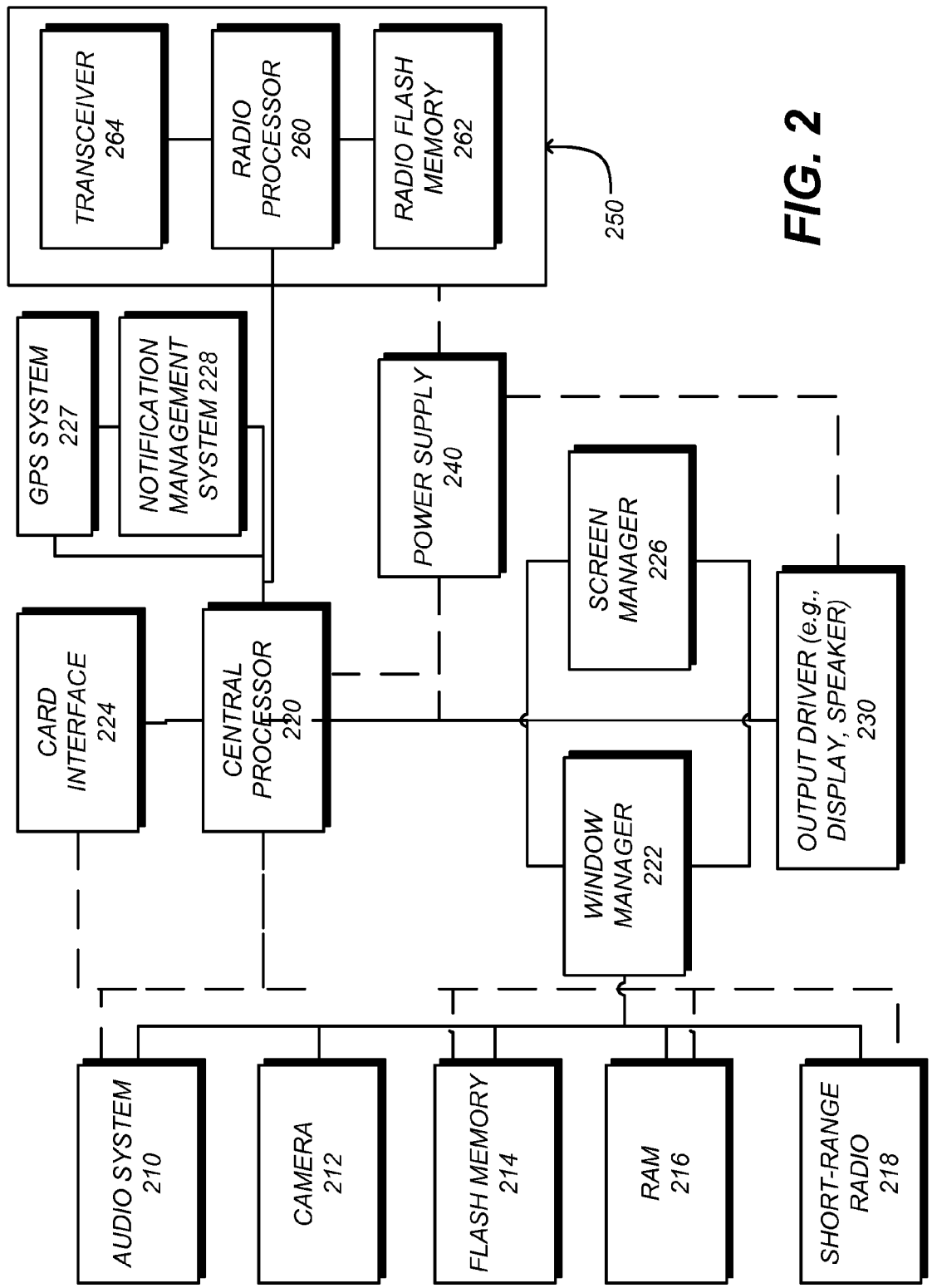
FIG. 2 illustrates one embodiment of an architecture of a mobile computing device.

Referring next to FIG. 2, a block diagram illustrates one embodiment of an architecture of a mobile computing device 110, with telephonic functionality. By way of example, the architecture illustrated in FIG. 2 will be described with respect to the mobile computing device of FIG. 1. The mobile computing device 110 includes a central processor 220, a power supply 240, and a radio subsystem 250. The central processor 220 communicates with: audio system 210, camera 212, flash memory 214, RAM memory 216, short range radio module 218 (e.g., Bluetooth, Wireless Fidelity (WiFi) component), a window manager module 222, a screen manager module 226, a global positioning management system module 227, and a notification management system module 228. The power supply 240 powers the central processor 220, the radio subsystem module 250 and output device drivers 230, for example, a display driver (which may be contact- or inductive-sensitive) and/or an audio driver (which may include volume control in addition to speaker output). The power supply 240 may correspond to a battery pack (e.g., rechargeable) or a powerline connection or component.

In one embodiment, the window manager module (or window manager) 222 comprises a software or firmware process that initializes a virtual display space stored in the RAM 216 and/or the flash memory 214. The virtual display space includes one or more applications currently being executed by a user and the current status of the executed applications. The window manager 222 receives requests, from user input or from software or firmware processes, to show a window and determines the initial position of the requested window. Additionally, the window manager 222 receives commands or instructions to modify a window, such as resizing the window, moving the window or any other command altering the appearance or position of the window, and modifies the window accordingly.

The screen manager module (or screen manager) 226 comprises a software or firmware process that manages content displayed on the screen 130. In one embodiment, the screen manager 226 monitors and controls the physical location of data displayed on the screen 130 and which data is displayed on the screen 130. The screen manager 226 alters or updates the location of data on the screen 130 responsive to input from the central processor 220, to modify the screen 130 appearance. In one embodiment, the screen manager 226 also monitors and controls screen brightness. Further, it transmits control signals to the central processor 220 to modify screen brightness and power usage to the screen 130. It is noted that applications, for example as described in FIGS. 3 through 5 below, can be configured to present user interfaces to a user by having those applications interface with the window manager 222 and screen manager 226 to ultimately have the output driver 230 display the user interface on the screen 130 of the mobile computing device 110.

The radio subsystem module (or radio subsystem) 250 includes a radio processor 260, a radio memory 262, and a transceiver 264. The transceiver 264 may be two separate components for transmitting and receiving signals or a single component for both transmitting and receiving signals. In either instance, it is referenced as a transceiver 264. The receiver portion of the transceiver 264 communicatively couples with a radio signal input of the device 110, e.g., an antenna, where communication signals are received from an established call (e.g., a connected or on-going call). The received communication signals include voice (or other sound signals) received from the call and processed by the radio processor 260 for output through the speaker 120 (or 184). The transmitter portion of the transceiver 264 communicatively couples a radio signal output of the device 110, e.g., the antenna, where communication signals are transmitted to an established (e.g., a connected (or coupled) or active) call. The communication signals for transmission include voice, e.g., received through the microphone 160 of the device 110, (or other sound signals) that is processed by the radio processor 260 for transmission through the transmitter of the transceiver 264 to the established call.

In one embodiment, communications using the described radio communications may be over a voice or data network. Examples of voice networks include Global System of Mobile (GSM) communication system, a Code Division, Multiple Access (CDMA system), and a Universal Mobile Telecommunications System (UMTS). Examples of data networks include General Packet Radio Service (GPRS), third-generation (3G) mobile, High Speed Download Packet Access (HSDPA), High Speed Uplink Packet Access (HSUPA), and Worldwide Interoperability for Microwave Access (WiMAX).

While other components may be provided with the radio subsystem 250, the basic components shown provide the ability for the mobile computing device to perform radio-frequency communications, including telephonic communications. In an embodiment, many, if not all, of the components under the control of the central processor 220 are not required by the radio subsystem 250 when a telephone call is established, e.g., connected or ongoing. The radio processor 260 may communicate with central processor 220 using a serial line 278.

The card interface 224 is adapted to communicate with the expansion slot expansion slot. The card interface 224 transmits data and/or instructions between the central processor and an expansion card or media card included in the expansion slot. The card interface 224 also transmits control signals from the central processor 220 to the expansion slot to configure an expansion card or media card included in the expansion slot.

The global positioning system 227 is a hardware, software and/or firmware module that includes instructions for receiving (or retrieving or accessing) location (or position) corresponding to the device. This position information is derived from received GPS signals. It is noted that the device can be configured to leverage other technology as a substitute or in addition to the GPS information to determine location of the device. For example, signals from 802.11 (or Wi-Fi) networks or cellular networks can be used to triangulate (e.g., cellular tower triangulation) to determine the geographical position.

The notification management system 228 comprises one or more modules of software and/or firmware that include instructions to control (or adjust) notification mechanisms within the mobile computing device 130. Examples of notification mechanisms that can be controlled include ringer volume, ring tones, lighting and vibration modes on the mobile computing device 130. It is noted that the notification management system 228 is configured to interface with one or more applications, such as a phone application or messaging application. In turn, these applications may interface with the radio subsystem, for example, to receive incoming telephone calls or incoming short message service (SMS) or electronic mail messages.

In one embodiment, central processor 220 executes logic (by way of programming, code, instructions) corresponding to executing applications interfaced through, for example, the navigation area 140 or switches 170. It is noted that numerous other components and variations are possible to the hardware architecture of the computing device 200, thus an embodiment such as shown by FIG. 2 is just illustrative of one implementation for an embodiment.

Notification Management System

Figure 3:
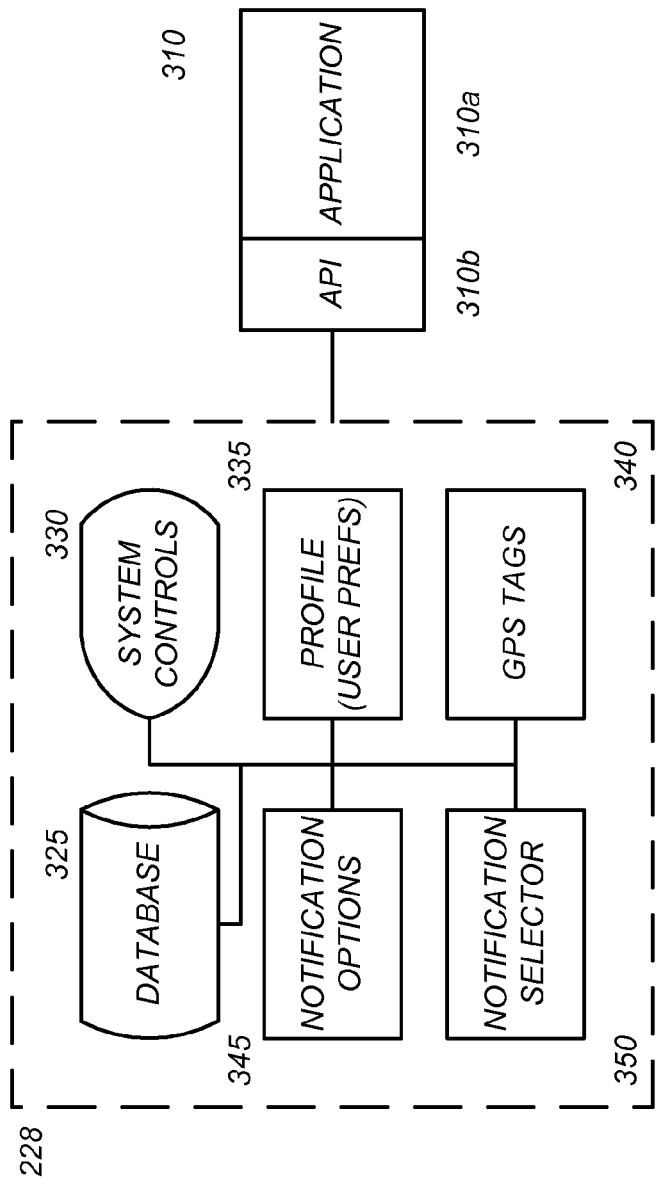
FIG. 3 illustrates one embodiment of a notification management system for a mobile computing device.

FIG. 3 illustrates one embodiment of the notification management system 228 for a mobile computing device. One or more applications (generally 310) each comprise instructions executable by the processor 220. For ease of discussion, one application is illustrated and described, although it is understood there may be more than one application and the principles disclosed herein are applicable across each.

The application 310 includes the application itself 310a includes an application programming interface (API) 310b. The application 310b communicatively couples the notification management system 228 through the API 310a. For ease of discussion, the application will be referenced as application 310.

The application 310 is one of many possible applications that may leverage a notification management system 228. Examples include communication applications such as a phone application, a short message service (SMS) application, an instant messenger application, an electronic mail application, or a pager application. Other examples of an application include personal information type managers such as calendar applications and task (or to-do) applications. Still other example applications include widgets or other object that leverages a web platform such as a weather widget or a feed widget.

The notification management system 228 interfaces with one or more notification mechanisms on the mobile computing device 110, for example, through the processor 220 and output driver 230, to control (or adjust) notification settings of the mobile computing device 110. Examples of the notification mechanisms within the mobile computing device 110 include audible, visual or physical notification mechanisms and corresponding modes. Examples of audible mechanisms include ringer and/or sound controls such as volume, ringer off (including mute) and ring tones. Examples of physical mechanisms include light emitting diode (LED) or fiber optic lighting and/or indicators. The lighting can be configured to change visual indicator from one color to another color or change between two or more visual indicators or states. Examples of physical mechanisms include vibration or pulse.

The notification management system 228 includes a database 325, a system control module 330, a profile manager module 335, one or more global positioning tags 340, a notification options module 345, and a notification selector module 350. The database 325 is configured to store parameters, data and other information relating to the system control module 330, the profile manager module 335, the one or more global positioning system (GPS) tags 340, the notification options module 345, and the notification selector module 350.

The system controls module 330 is configured to communicatively couple (or interface) with the notification mechanisms on the mobile computing device 110. The profile manager 335 provides a central user interface for managing notification configurations. The notification options module 345 and notification selector 350 module may present their interfaces through the user profile manager 335. In addition, the user profile manager 335 can be configured to override default options that may be set through the notification options module 345 or notification selector module 350. The profile manager 335 also includes options to allow user settings to be overridden by external settings that may be pushed down to the mobile computing device 110.

The notification options module 345 is configured to present to the user, e.g., through a user interface on the display 130, options for notification. The options include identification of one or more applications configured to interface with the notification management system 228, parameters for location or time information to trigger a notification configuration change (or change in notification state), the type of notification corresponding to a particular location (or time), and options for selectable notification mechanisms or types of notification that are associated with one or more notification mechanisms. The notification selector module 350 is configured to interface with the system controls to signal the type of notification setting to change to (or change in notification state) in response an event as set forth (or defined) in the user profile 335. The event can be a location based or time based event.

The GPS tags 350 provide latitude and longitudinal values and a range, e.g., radius about that latitude and longitudinal value. The GPS tags 350 provide location information for use with the notification options.

By way of example, the notification management system 228 can be configured as described herein. A user may configure a user profile through the profile manager 335 to set up notification options and selection. The profile manager 335 is configured to provide an interface to one or more fields that correspond to the parameters for use with the notification management system 228. The one or more fields may be in any data entry format, e.g., open character (e.g., text and/or numbers) entry fields, table, drop down, or list format, that allows for input and/or selection of application type, optional location name, location, notification options, and reversion/override option. Each grouping of this information may be referred to as a 'configuration file'.

The location field further interfaces with the notification options module 345 and the one or more GPS tags 340. In addition, the notification options further interface with the notification options module 345. The entries provided by the user are stored in the database 325. Within the profile manager 335, the application type corresponds to the application for which notification control is affected, e.g., phone application, electronic mail application, calendar application, etc. The optional location name corresponds to a user selectable or enterable name for the location in which the notification change would take effect so that the user can easily identify it. Examples for the optional location name may be 'Movie Theater', 'School', or 'Conference Keynote.'

The location corresponds to the physical location where the notification change or pre-determined setting is to occur. In one embodiment, the physical location may be previously 'tagged' through it GPS coordinates, i.e., latitude and longitude, as may include a tolerance or range value, e.g., within x meters or feet of the tagged location (x corresponding to a numerical value) or within a radius of y meters or feet. The location information can be retrieved from among prestored GPS tags 340, can be manually entered, can be searched (e.g., online database providing prestored GPS coordinates) or can be set when the user is at a particular location and is given an option to store the location as a GPS tag on the mobile computing device 110. Subsequently, when the system is operational, the triggering event for the notification adjustment is the device identifying a current location that is at or within the range specified.

Alternately, the physical location can be identified through a particular field within an application. For example, a calendar entry may include a location field within which a location corresponding to a meeting has been entered. This location can be provided as a character string, e.g., "Classroom". The "Classroom" entry is stored in the database 325 as associated with a particular notification, as described below. Rather than the physical location triggering the change in notification, in this instance, the triggering event is the time. The system 228 presumes the user will be or is at the particular location at the time set for the event and proceeds with changing the notification state on the mobile computing device 110 accordingly.

It is noted that the system could be further configured to change notification settings (or state) of the mobile computing device 110 based on time apart from location. This configuration can be enabled as a data field accessible through the user profile 335 and is configured so that at a particular time as entered the notification setting changes. For example, at "10:00 PM" the phone application notification setting can be adjusted (or changed), to 'ringer off' or 'vibrate' mode so that the mobile computing device 110 is audibly silent when the phone application receives a phone call.

The notification options correspond to type of notification that the mobile computing device should be set to at the occurrence of a particular event, e.g., being at a particular location (or at a particular time). The selectable notifications can be audible, visual, physical, or combination thereof. Examples of the various notifications were provided previously.

The reversion field is an optional field in the user profile 335. Specifically, the reversion field 335 can be included to allow for selection of reverting the notification settings from their new state back to the original (or just prior) state once the location or time changes and is no longer within the parameter boundaries driving the change in notification state (i.e., the notification adjustment).

Further, there also may be an optional override field (or two or more fields in series or parallel). The override field is structured so that the user can enter in additional parameters that allow the notification state to be changed even through the current parameters, e.g., location or time, have changed the device 110 notification state. For example, if the user profile is set so that in a movie theater the notification management system 228 automatically is set to a ringer off (or mute) notification state, the override parameters can be configured so that the ringer off notification state changes to a vibrate or ringer on notification state if there is an incoming message from a particular application such as a phone call from a pre-identified phone number or contact name from an address book (e.g., a doctor or baby sister telephone number or name). Moreover, the notification settings and corresponding mechanisms can be adjusted on a contact by contact basis (e.g., the contacts from within an address book or phone list) with different notification options. For example, if configuration file can switch an audible notification within the device for a phone call to a lighted notification. Further, the lighted notification can be further configured so that the device lights in one color for a particular set of users, e.g., family or medical contacts, but a different color for other sets of users.

In some embodiments, the change of notification state can be dictated by the particular location. For example, in one embodiment, the user profile can be configured to activate reception of a configuration file (e.g., through the radio subsystem 250 of the mobile computing device) from a particular location, e.g., a movie theater that seeks to enforce a 'no-ring zone' for telephone. The mobile computing device 110 can be configured to receive activate and optionally save in the database 325. The configuration file can be configured to provide the default settings within the user profile 335 for the particular location and can be further configured to prevent a user from further changing some fields, e.g., type of notification setting, while allowing changes to other fields, e.g., override and location name.

It is noted that although the user can set the parameters though the user profile 335, the system 228 can be configured so that the parameters of each field or in a subset of the fields is preset to a system default. Once set parameters are stored in the database 228 they are ready to be retrieved when the notification management system 228 is activated and operational. In addition, it is noted that each set of entries corresponding to location can be saved through the user profile 335 in the database 325 as a configuration file. The configuration file can be saved as a separate file (e.g., having its own file name and extension) for each entry or can be saved as a single file with sub-section or subfiles within it (e.g., saved as a single active file and extension, but subdivided within that file).

In one embodiment, when the notification management system 228 is operational in the mobile computing device 110, depending on the triggering event of location or time, the system 228 changes the notification setting for the mobile computing device 110 from its present notification state, e.g., ringer on, to a second notification state, e.g., ringer off (or mute) and/or vibrate based on the information stored in the database 325 per the user profile 335 set up. If the mobile computing device 110 already is in the state identified in the user profile 335 for the particular event trigger, e.g., location or place, the device 110 is kept in that state until another event trigger, e.g., change to increased ringer volume in response to changing locations outdoors or entering conventional hall, or until it is manually set on the mobile computing device 110 by the user.

Operational Examples

Figure 4:
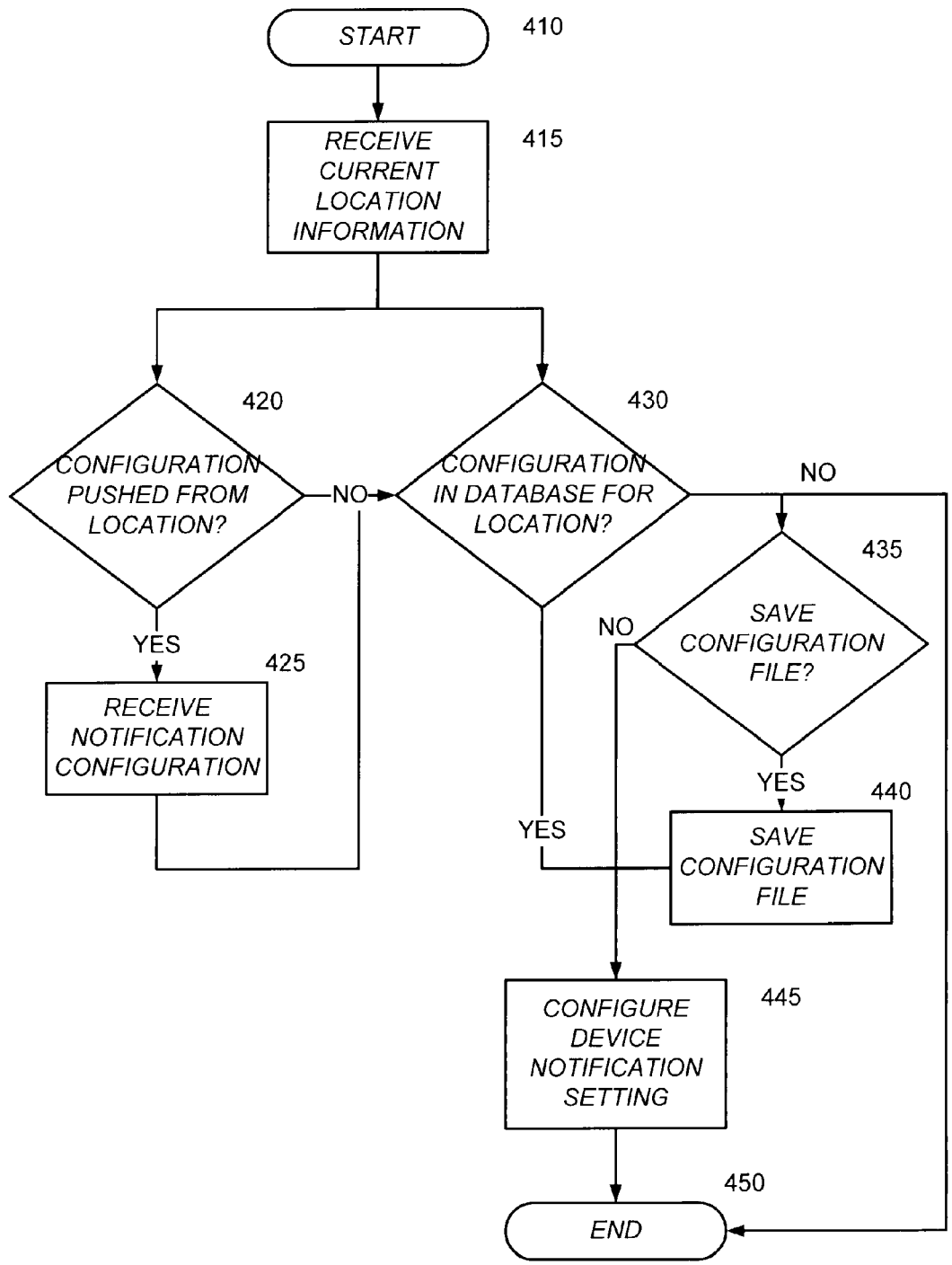
FIG. 4 illustrates one example embodiment of a process for notification processing based on identification of the device at a geographic location.
Figure 5:
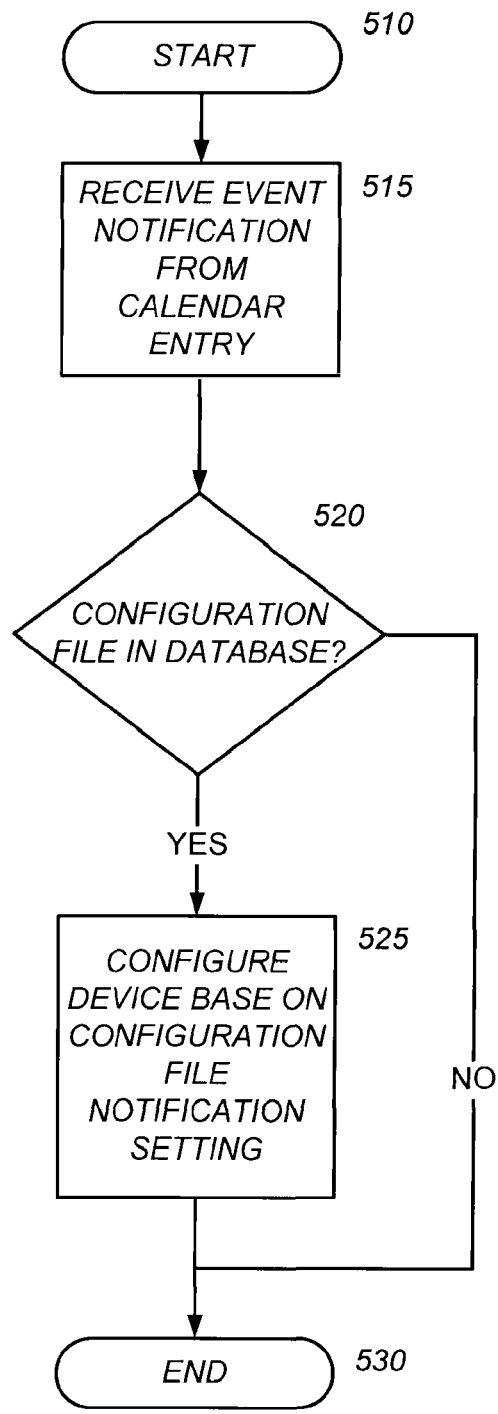
FIG. 5 illustrates one example embodiment of a process for notification processing based on identification of the device based on predetermined entries within a calendar.

FIGS. 4 and 5 provide operational examples of the notification management system 228 in the context of location (FIG. 4) and in the context of time (FIG. 5). Referring first to FIG. 4, it illustrates one example embodiment of a process for notification processing based on identification of the device at a geographic location. In this example embodiment, the notification settings are changed based on location (or positional) data received by the mobile computing device.

The process starts with receiving current location of the mobile computing device 110. The current location information may include a GPS signal received through the GPS system 227. The GPS signal includes latitude and longitude coordinates. In one embodiment, the system 228 determines 420 if the current location information includes instructions pushed from a particular location, e.g., a theater or classroom. If yes, and the mobile computing device 110 is configured to accept or receive the particular instructions, the system 228 receives 425 the instructions received by the mobile computing device 110. The instructions may include a default configuration file for the user profile 335 indicating the location name, notification setting, and GPS tag, which includes the tolerance in which the settings of the particular notification state would take effect relative to this particular location.

The system 228 determines 430 if the configuration file is in the database 325. If not, the user profile 335 can be configured to notify the user and determine 435 whether the configuration file should be saved 440, e.g., in the database 325 for future reference, or should be discarded after leaving the particular location. The system then configures 445 the device based on the notification settings in the received configuration file. For example, the notification selector 350 transmits a signal to the system controls 330 to change the appropriate notification settings for the particular applications defined in the configuration file such as switching the ringer state from ringer on to ringer off (mute) or vice versa (e.g., through a software instruction to not send a signal for a ring to the speaker or turning off an audible mechanism such as a speaker). Thereafter, the process can end 450.

It is noted that the ending 450 of the process includes maintaining the current notification settings of the mobile computing device 110. It also may include awaiting a change in event status, e.g., reversion to settings right before changing of the notification settings (and state) based on the configuration file or some other event that changes the notification settings of the mobile computing device 110, e.g., moving away from the particular location or out of range of the particular coordinates effecting the change (or adjustment) in notification settings (and state).

In embodiments where the received information is only the GPS coordinates, there may be no other external information to trigger the change in notification settings (and state) in the mobile computing device 110. In these embodiments, the system 228 obtains the GPS coordinates and determines 430 whether the received coordinates correspond to a particular configuration file in the database 325 that includes the coordinates received, including in some instances taking into account the tolerance values, e.g., within a predetermined distance or radius of the coordinates. If not the process may end 450 as noted above. If there is a configuration file in the database 325 that applies, the system 228 configures 445 the mobile computing device 110 in accordance with the notification settings in the file. In one embodiment, this may be referenced as a notification adjustment event. For example, the notification selector 350 transmits a signal to the system controls 330 to change the appropriate notification settings for the particular applications defined the notification settings are initiated the process can end 450 as noted above.

The configuration as described in FIG. 4 is particularly beneficial for automating changes (or adjustments) made to notification settings for particular applications when particular locations necessitate such changes (or adjustments). For example, a user may set up in the user profile 335 configuration files for locations such as movie theaters, concert halls, sport stadiums, schools, etc. In each instance, the adjustments can be configured so that audible sounds are decreased, increased, or eliminated (muted) and, if desired, other indicators, e.g., visual or physical, can be activated automatically without the need for the user to intervene. Hence, the automated system eliminates the need and effort of requiring the user to set and re-set notification mechanisms across one or more applications in response to each change in location.

Turning next to FIG. 5, it illustrates one example embodiment of a process for notification processing based on identification of the device based on predetermined entries within a calendar. In this example embodiment, the notification settings are primarily set based on time parameters. The time parameters include a time field within an application (e.g., a calendar application) and is comparable with a time as provided through a computing system clock.

In this example embodiment, the process starts 510 and receives 515 an event notification from a calendar entry. In one embodiment, the calendar entry includes at least a time field and a location field. The event notification includes additional details in the location field, e.g., a location for the event such as meeting room or classroom. The additional information can be used to determine 520 whether there is a configuration file corresponding to that location in the database 325. In the database 325, the pre-stored location information can be stored as a "location tag" (e.g., a location identifier by name or by latitude and longitudinal coordinates). If no configuration file exists the process can end 530. Ending includes awaiting the next event that may trigger a change in the notification settings.

If there is a configuration file in the database 325 corresponding to the additional information, the notification selector 350 signals the system control 330. The system control 330 configures the mobile computing device 110 notification mechanisms according to the parameters set in the configuration file for the particular application or applications. The process then ends 450 as noted above.

It is noted that in alternate embodiments, a notification trigger corresponding to an event can be associated with a particular activity rather than a location. For example, the activity can be a "Meeting" or "Class" and may be included in a subject field of a calendar. The notification trigger identifies these notification trigger tags in the subject field of the calendar and determines whether a corresponding configuration file exists in the database 325 for changing the state of the device 110 notification. Continuing with this example, a tag of "Meeting" in the calendar may include instructions in the database 325 to place the mobile computing device 110 into a mute state for the duration of the meeting (e.g., as determined by the time parameters in the calendar entry). When the event is over (e.g., end time on the calendar), the configuration file includes instructions to change the state of the notification on the device 110 from a mute state to a ringer on state.

The configuration as described in FIG. 5 is particularly beneficial for automating changes (or adjustments) made to notification settings for particular applications when there is consistency among a multiple entries. For example, a user may indicate in the calendar application executing within the mobile computing device certain days and times in which the user is in class during the school day or in meetings during the work day. The user can create a profile in the notification management system labeled "Meeting Room" or "Classroom". This label is then inserted into the location field of the calendar entry and linked the configuration file in the notification management system 228. Thereafter, each time period in which the location information "Meeting Room" or "Classroom" is encountered in the location field of each calendar entry the system 228 automatically configures the notification mechanisms on the mobile computing device. Likewise, rather than a location, the system can be configured to use another event notification label (e.g., in a "subject field") such as "Meeting" or "Class" in lieu of location and thereafter associate these labels are stored as particular configuration files in the database 325.

In each instance, using either the subject field or the location field to identify particular tags for a particular event, the notification selector 350 signals the system controls 330 to change the notification settings on the mobile computing device 110 for applications as identified by the user in the configuration file, e.g., as set through the user profile for name of "Meeting", "Class", "Meeting Room", "Classroom". Hence, the user is relieved from having to affirmatively seek to change notification settings in particular environments. Moreover, the system beneficially can have the notification revert back to an original notification setting once the particular time slot is passed.

Additional Considerations

Some portions of above description describe the embodiments in terms of algorithms (e.g., flowcharts) and symbolic representations of operations (e.g., block diagrams) on information, for example, in FIGS. 3 through 5. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof. The computer programs are executable by a processor and it is noted that in some instances portions of the computer programs provide for an analysis that the processor can implement as analysis module.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for changing (or adjusting) notification mechanisms for a mobile computing device in response to pre-determined location information of the mobile computing device. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A computing device comprising:
 a number of output devices;
 a memory to store one or more calendar entries and one or more configuration files; and
 a processor coupled to the number of output devices and the memory, the processor to:
  identify an event specified by a calendar entry, the calendar entry including time information about the event;

determine that a configuration file corresponding to the event exists in the memory, the configuration file including information to adjust at least one notification setting of the computing device; and based on the configuration file, adjust the at least one notification setting of the computing device from a prior notification state to a new notification state.

2. The computing device of claim 1, wherein the configuration file includes information about an application that provides one or more audible, visual, or physical notifications via the number of output devices.

3. The computing device of claim 2, wherein the application corresponds to a phone application or a messaging application, wherein the audible notification corresponds to a ring tone, and wherein the processor adjusts the at least one notification setting by increasing, decreasing, or muting a volume of the ring tone.

4. The computing device of claim 1, wherein the processor further:
   determines when the event ends based on the time information; and
   adjusts the at least one notification setting back to the prior notification state when the event ends.

5. The computing device of claim 1, wherein the processor identifies the configuration file that corresponds to the event by using a name of the event from the calendar entry.

6. A method for automatically adjusting a notification setting of a computing device, the method comprising:
   identifying an event specified by a calendar entry, the calendar entry including time information about the event;
   determining that a configuration file corresponding to the event exists in a memory of the computing device, the configuration file including information to adjust at least one notification setting of the computing device; and
   based on the configuration file, adjusting the at least one notification setting of the computing device from a prior notification state to a new notification state.

7. The method of claim 6, wherein the configuration file includes information about an application that provides one or more audible, visual, or physical notifications.

8. The method of claim 7, wherein the application corresponds to a phone application or a messaging application, wherein the audible notification corresponds to a ring tone, and wherein adjusting the notification setting includes increasing, decreasing, or muting a volume of the ring tone.

9. The method of claim 6, further comprising:
   determining when the event ends based on the time information; and
   adjusting the at least one notification setting back to the prior notification state when the event ends.

10. A non-transitory computer readable storage medium storing instructions that, when executed by one or more processors of a computing device, cause the one or more processors to:
   identify an event specified by a calendar entry, the calendar entry including time information about the event;
   determine that a configuration file corresponding to the event exists in a memory of the computing device, the configuration file including information to adjust at least one notification setting of the computing device; and
   based on the configuration file, adjust the at least one notification setting of the computing device from a prior notification state to a new notification state.

11. The non-transitory computer readable storage medium of claim 10, wherein the configuration file includes information about an application that provides one or more audible, visual, or physical notifications.

12. The non-transitory computer readable storage medium of claim 11, wherein the application corresponds to a phone application or a messaging application, wherein the audible notification corresponds to a ring tone, and wherein the instructions cause the one or more processors to adjust the at least one notification setting by increasing, decreasing, or muting a volume of the ring tone.

13. The non-transitory computer readable storage medium of claim 10, wherein the instructions further cause the one or more processors to:
   determine when the event ends based on the time information; and
   adjust the at least one notification setting back to the prior notification state when the event ends.

14. A computing device comprising:
   a memory to store (i) one or more applications including a calendar application, (ii) one or more configuration files, and (iii) one or more calendar entries for the calendar application, each calendar entry including information about a corresponding event and time information about the corresponding event;
   processor coupled to the memory, the processor to:
      identify at least one event specified by a selected calendar entry based on the time information about the at least one event;
      determine that a configuration file corresponding to the at least one event exists in the memory, the configuration file including information to adjust at least one notification setting of the computing device; and
      based on the configuration file, adjust the at least one notification setting of the computing device from a prior notification state to a new notification state.

15. The computing device of claim 14, wherein the configuration file includes information about an application that provides one or more audible, visual, or physical notifications.

16. The computing device of claim 15, wherein the application corresponds to a phone application or a messaging application, wherein the audible notification corresponds to a ring tone, and wherein the processor adjusts the at least one notification setting by increasing, decreasing, or muting a volume of the ring tone.

17. The computing device of claim 14, wherein the processor identifies the configuration file that corresponds to the at least one event by using a name of the at least one event from the calendar entry.

18. The computing device of claim 15, wherein the physical notification corresponds to a vibration of the computing device, and wherein the processor adjusts the at least one notification setting by turning on or turning off a vibration feature of the computing device.

* * * * *